(12) United States Patent
Mozano et al.

(10) Patent No.: US 11,626,998 B2
(45) Date of Patent: Apr. 11, 2023

(54) VALIDATED PAYLOAD EXECUTION

(71) Applicant: ServiceNow, Inc., Santa Clara, CA (US)

(72) Inventors: Ashton Mozano, San Diego, CA (US); Vincent Seguin, Rancho Santa Fe, CA (US); Charlie Sharp, San Francisco, CA (US); Lauren Karina Choi, San Francisco, CA (US); Anson Barber Mayers, San Rafael, CA (US); Michael Christopher John Albinson, New York, NY (US); Joel Fischer, Oakland, CA (US)

(73) Assignee: ServiceNow, Inc., Santa Clara, CA (US)

( * ) Notice: Subject to any disclaimer, the term of this patent is extended or adjusted under 35 U.S.C. 154(b) by 143 days.

(21) Appl. No.: 16/934,438

(22) Filed: Jul. 21, 2020

(65) Prior Publication Data
US 2022/0029820 A1   Jan. 27, 2022

(51) Int. Cl.
*H04L 9/32* (2006.01)
(52) U.S. Cl.
CPC .......... *H04L 9/3247* (2013.01); *H04L 9/3213* (2013.01)
(58) Field of Classification Search
None
See application file for complete search history.

(56) References Cited

U.S. PATENT DOCUMENTS

| | | | | |
|---|---|---|---|---|
| 8,369,521 | B2* | 2/2013 | Ward | G06F 21/34 713/168 |
| 8,805,793 | B2* | 8/2014 | Patiejunas | G06F 16/21 707/687 |
| 9,699,167 | B1* | 7/2017 | Tovino | H04L 9/0861 |
| 10,374,809 | B1* | 8/2019 | Dasarakothapalli | H04L 9/30 |
| 10,693,901 | B1* | 6/2020 | Chan | H04L 67/02 |
| 10,742,422 | B1* | 8/2020 | Jarjoui | G06Q 20/367 |
| 2015/0188712 | A1* | 7/2015 | Teuwen | H04L 9/3236 713/176 |
| 2020/0401506 | A1* | 12/2020 | Sathianarayanan | G06F 9/54 |
| 2021/0279079 | A1* | 9/2021 | Shrivastava | G06Q 10/00 |

* cited by examiner

*Primary Examiner* — Jeffrey C Pwu
*Assistant Examiner* — Mayasa A. Shaawat
(74) *Attorney, Agent, or Firm* — Van Pelt, Yi & James LLP

(57) ABSTRACT

A request to sign a provided payload is received, wherein the payload includes an automation script specified to execute on one or more management service instances. The automation script is validated, including by modifying the payload to add metadata data associated with the validation. An encrypted version of a digital signature private key that was received is sent to a credential system. An unencrypted version is received and used to sign the modified payload. The signed modified payload is provided in response to the request to sign the provided payload. The signed modified payload is configured to, in response to a request to execute the automation script on the one or more of the management service instances, be verified using a public key corresponding to the digital signature private key and allow a validation of the automation script at least in part by using the included added metadata.

20 Claims, 8 Drawing Sheets

VALIDATED PAYLOAD EXECUTION

BACKGROUND OF THE INVENTION

Cloud-based solutions allow businesses to rapidly build and deploy software applications. These solutions allow customers to direct their focus on business needs by replacing significant portions of the IT management with a unified cloud-hosted service platform. Unlike self-hosting, cloud-hosted software and hardware can be quickly scaled up and down to provide customers with increased flexibility and control. Using a unified cloud-hosted service platform, customers can also easily add new business applications including the ability to automate and extend business workflows that are not traditionally digital. Although much of the IT responsibility is removed when utilizing a cloud-based solution, some customers may still desire to run their own application scripts on the cloud-hosted service instances managed using a cloud-hosted service platform. For example, these application scripts can be used to customize the monitoring and configuration of cloud-based hardware and deployed software.

BRIEF DESCRIPTION OF THE DRAWINGS

Various embodiments of the invention are disclosed in the following detailed description and the accompanying drawings.

DETAILED DESCRIPTION

Figure 1:
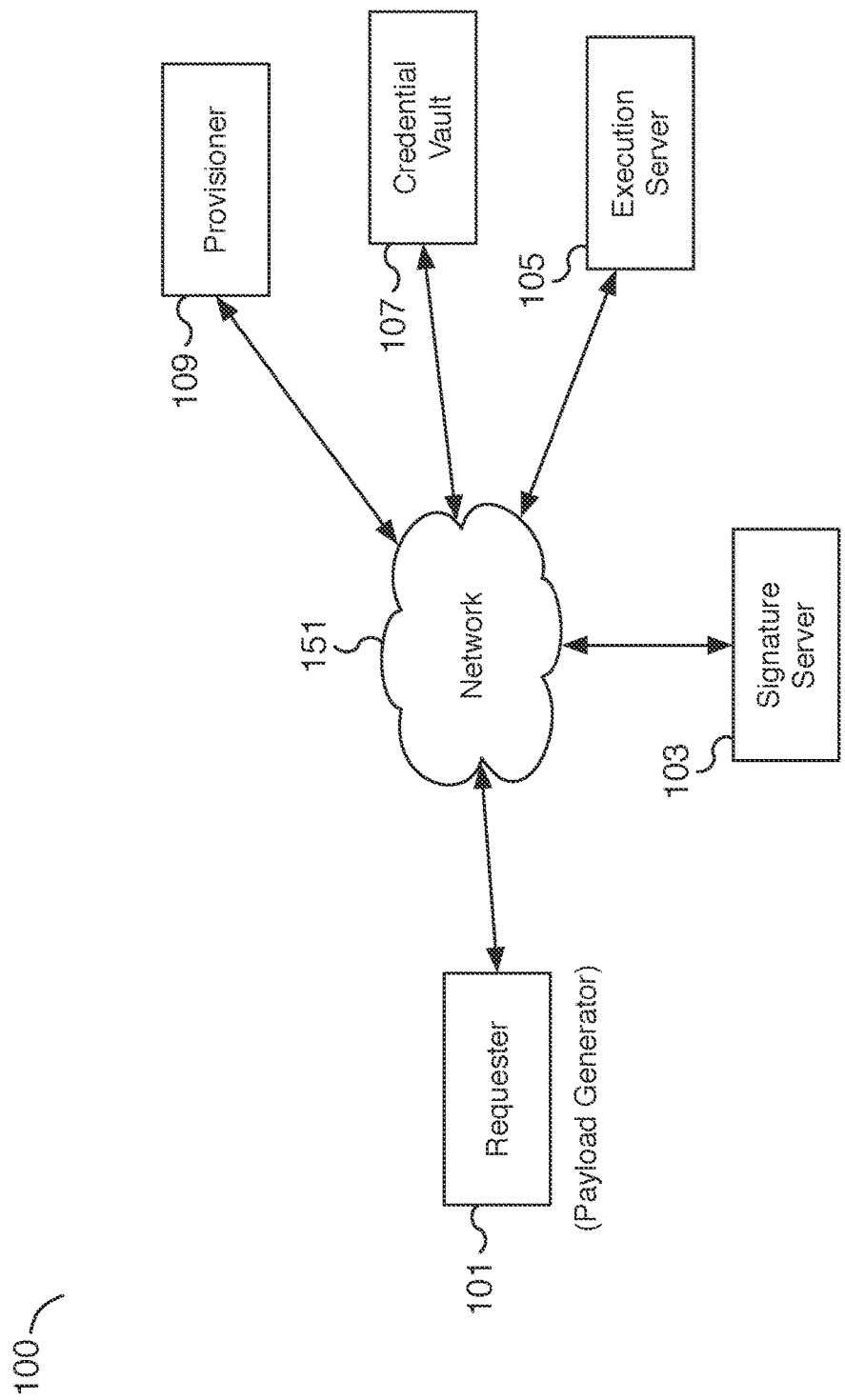
FIG. 1 is a block diagram illustrating an example of a secure deployment platform for automation scripts.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A secure deployment platform for executing validated applications is disclosed. For example, using the disclosed techniques, a customer of a cloud-based service platform can execute an application such as an automation script on a set of target management service instances. The automation script can be executed via the cloud-based service platform and used to automate the management of the instances. In some embodiments, the scripts are uploaded to a central location such as a front-end to a cloud platform before being eventually deployed to the instance target endpoints for execution. The results of the deployed application executions can be returned to the requester. In some embodiments, the automation scripts are used for analytics, configuration, management, or another appropriate task. The ability to deploy the scripts to multiple target instances allows for efficient and flexible administration of management service instances.

In various embodiments, the application scripts are deployed to target instances as a validated payload. This validation and deployment can be completed over multiple steps that are each hardened to improve security and ensure that only authorized applications can be executed on the appropriate target instances by the appropriate users. At each step, security techniques are deployed to limit the exposure to threats. For example, in response to a user deployment request of an automation script, the script can only be uploaded to the cloud service platform after a user is authenticated with a requester. In some embodiments, the requester runs as a requester service. The requester service will itself mutually authenticate with a signature server and request to the signature server that the automation script be signed. In some embodiments, as part of the signature request, the request to execute the automation script must specify the target management service instances on which to run the automation script. At the signature server, the requester and target instances can be compared to one or more whitelists, such as domain, sub-domain, and IP address whitelists. The whitelists can include ranges such as one or more IP address ranges. In some embodiments, a whitelist is specified using wildcards and/or regular expressions. Once validation at the signature server is complete, a payload including the automation script and additional metadata associated with the payload validation can be signed using a private key. The signed payload is returned to the requester where it is then forwarded to an execution server. In various embodiments, the private key used to sign the payload is stored in an encrypted format and is only decrypted by accessing a credential vault.

In some embodiments, an execution server receives a signed payload associated with an automation script that includes additional metadata associated with validation. The execution server performs a series of additional validations such as validating the origin of the request with one or more whitelists. The signed payload is then verified using the corresponding public key (or certificate) of the private key used by the signature server. In some embodiments, the payload includes an associated signed security token. In some embodiments, the security token includes the target instances and/or the account settings and/or privileges that should be utilized when deploying the automation script on the target instances. In some embodiments, the security token specifies execution configuration parameters such as an expiration time or expiration date of the token. In some embodiments, the execution configuration includes an execution count. For example, a token can be configured for only one-time use. As another example, a token can be configured for multiple uses and/or specify that the total execution count should not exceed the maximum count.

In some embodiments, once validation at the execution server is complete, the automation script is extracted from the payload and deployed to the target management service instances for execution. The automation scripts can gather return results which are returned back to the execution requester. For example, a script result is returned to the requester and can include analytics information, configuration information, configuration results, etc. In some embodiments, the automation results are written to a results data store such as a customer database. In some embodiments, the results can also be returned to the original user who requested the automation script deployment via a user interface of the cloud service platform.

In various embodiments, the secure deployment platform allows an automation script to be executed only after multiple steps of validation checks has been successfully passed. By splitting the deployment and validation across multiple steps and hardware components, the different services of the secure deployment platform such as the requester, the signature server, the execution server, and the credential vault, among others, can be individually monitored for security threats and/or breaches and provide multiple layers of security. Moreover, the added security and flexibility of the disclosed secure deployment platform allow a customer to improve on the management of management service instances without the additional overhead and costs typically associated with administrative tasks. Complex security operations including the selection of cryptography ciphers, generation of public/private/symmetric keys, secure storage and usage of keys, support for security auditing, and support for security compliance, etc. are handled and/or supported by the secure deployment platform and are made accessible to customers who may have little domain knowledge in computer security.

In some embodiments, an encrypted version of a digital signature private key is received. For example, a signature server receives a private key wrapped with a key encipherment key. The private key and its corresponding public key/certificate may utilize an Edwards-curve digital signature algorithm or another appropriate digital signature scheme. In some embodiments, the key encipherment key is stored on a credential vault separate from the signature server. In some embodiments, a request to sign a provided payload is received. The payload includes an automation script specified to execute on one or more management service instances. For example, an automation script is passed by a requester service to the signature server for signing. In some embodiments, the automation script is validated, including by modifying the payload to add metadata data associated with the validation to the payload. For example, the requester requesting the signing is validated along with the set of management service instances. Validation checks can include checking a domain, sub-domain, and/or IP address whitelist for both the requester and service instances for permission to execute the script on the corresponding instances. In some embodiments, the validation includes updating the payload with metadata of the validation such as including the validated management service instances targeted for executing the script. The metadata can also include execution run as settings, such as the user roles, permissions, and/or associated privilege settings for executing the script on the corresponding targets. The payload can also include an expiration time or expiration count. For example, the payload can be configured to expire at a certain time, after a certain time, or after an execution count has been met. In some embodiments, the execution configuration is stored in a security token. For example, the required token can be validated by an execution server before executing the script on the corresponding target instances.

In some embodiments, the encrypted version of the digital signature private key is sent to a credential system. For example, a credential vault storing the key encipherment key receives the encrypted version of the digital signature private key and decrypts the digital signature private key. In some embodiments, an unencrypted version of the digital signature private key that is valid for a limited amount of time is received from the credential system. For example, the credential vault sends the unwrapped digital signature private key to the signature server. In some embodiments, the unwrapped digital signature private key is only valid for a limited amount of time, such as 300 seconds or another appropriate time limit. For example, the unwrapped digital signature private key may be cached for only the specified limited amount of time before it is expired and deleted. In some embodiments, once the key is expired, the signature server will have to request that the encrypted version of the digital signature private key be again unwrapped.

In various embodiments, the unencrypted version of the digital signature private key is used to sign the modified payload. For example, the unwrapped private key can be used to sign the security token of the payload to confirm that the payload is validated. In some embodiments, the signed modified payload is provided in response to the request to sign the provided payload. For example, the signed payload is returned by the signature server to the requester. The signed modified payload is configured to, in response to a request to execute the automation script on the one or more of the management service instances, be verified using a public key corresponding to the digital signature private key. For example, the signed payload can be verified using the corresponding public key/certificate corresponding to the digital signature private key by an execution server. The signed modified payload is configured to allow a validation of the automation script at least in part by using the included added metadata. For example, using the metadata of the payload, an execution server can validate whether to deploy and execute the included automation script on the target instances. The target instances can be included in the payload and can be validated for access privileges. In some embodiments, the signed payload includes expiration information to determine whether the script is valid for execution. For example, an expiration time of a security token can be checked by an execution server to determine whether the payload is currently valid.

FIG. 1 is a block diagram illustrating an example of a secure deployment platform for automation scripts. In the example shown, secure deployment platform 100 includes requester 101, signature server 103, execution server 105, credential vault 107, and provisioner 109 that are communicatively connected to one another via network 151. In various embodiments, secure deployment platform 100 is part of a cloud-based service platform offering multiple service applications including the ability to host management service instances. In some embodiments, a customer accesses secure deployment platform 100 via the cloud-based service platform using a client such as a web client. A customer can request that an application such as an automation script be deployed and executed on a set of customer management service instances (not shown). In some embodiments, a request from a customer client (not shown) is received and processed at requester 101. In the event the request is allowed, the executed application results can be returned to the customer client via requester 101. In some embodiments, the executed application results are written to a results data store such as a customer database (not shown) managed by the cloud-based service platform.

In some embodiments, requester 101 provides an application, such as an unsigned automation script to execute on a set of target management service instances, to signature server 103 for signing. In the event the application is validated by signature server 103, requester 101 receives in return a signed payload that includes the application and validation metadata. Requester 101 forwards the signed payload to execution server 105 and receives the results from executing the application on the target instances. In various embodiments, the connection between requester 101 and signature server 103 and between requester 101 and execution server 105 are each mutually authenticated and each utilize a secure connection protocol such as using HTTPS/TLS or similar protocols.

In some embodiments, signature server 103 validates an application received from requester 101 for execution on target management service instances. The validation can include validating requester 101 and verifying that the application has no security threats. For example, the application can be checked for malware using a static analysis and/or other appropriate techniques. In the event the application is validated, signature server 103 generates a signed payload containing the application and additional data associated with the validation. In some embodiments, the signed payload is a signed token containing the application and metadata data. In various embodiments, signature server 103 signs the payload using a private key. The private key can be stored as an encrypted version of a digital signature private key. In some embodiments, the encrypted version of the digital signature private key is stored on a local data store (not shown) of signature server 103 using a protected format. For example, the encrypted version of a digital signature private key can be stored in a key vault of signature server 103 as a passphrase-protected object.

In some embodiments, signature server 103 retrieves the unencrypted version of a digital signature private key by first providing the encrypted version of the key to credential vault 107 and receiving the unencrypted version in return. In various embodiments, the unencrypted version of the private key may be cached by signature server 103 for a limited amount of time before being expired. For example, a valid cached unencrypted key can be used instead of requesting the encrypted key be again decrypted. Once expired, however, the memory associated with the unencrypted key can be wiped and the encrypted key must be again decrypted before a new payload can be signed.

In various embodiments, as part of a provisioning step, signature server 103 receives from provisioner 109 the encrypted version of a digital signature private key and an associated passphrase for securely storing the encrypted key locally. By only storing an encrypted version of the digital signature private key, the overall security of the platform is increased. In some embodiments, the unencrypted version of the private key is only stored in volatile memory and for only a limited amount of time.

In some embodiments, execution server 105 receives and validates a signed payload from requester 101. In some embodiments, the signed payload is a signed security token. Execution server 105 can validate the origin of the request using a whitelist and/or other appropriate techniques along with whether access to the target management service instances specified in the payload is appropriate. At least in part to verify the authenticity of the signed payload, execution server 105 utilizes the public key/certificate corresponding to the digital signature private key used to sign the payload. Using the public key/certificate and metadata of the payload, execution server 105 can validate the signed payload for authenticity and integrity and determine whether to deploy the application on target instances. In some embodiments, the metadata includes information utilized by execution server 105 such as token expiration information and application execution configuration settings. If the signed payload is validated, execution server 105 deploys the application to the appropriate target management service instances and gathers the corresponding application results. The results are then returned to requester 101.

In some embodiments, a key identifier is extracted by execution server 105 from the received signed payload and used to retrieve the corresponding public key or certificate. For example, a key identifier can be used to retrieve the corresponding public key/certificate from a key store residing locally on extraction server 105 or located remotely. Once retrieved, the public key/certificate can be used to validate a signed payload.

In some embodiments, execution server 105 receives the public key from provisioner 109 and stores the key locally for retrieval when needed. For example, execution server 105 receives the public key from provisioner 109 and stores the key as an unprotected cryptography object in a local key store. In various embodiments, the corresponding public and private key pairs are stored in separate locations. In various embodiments, a certificate corresponding to the public key is used instead of only the public key.

In some embodiments, credential vault 107 is a credential system for managing cryptographic keys and corresponding encryption/decryption tasks. For example, credential vault 107 is a key management system that can store a key encipherment key used to encrypt a private key, such as the digital signature private key used by signature server 103. In some embodiments, credential vault 107 encrypts a private key using a stored key encipherment key provided by provisioner 109. For example, provisioner 109 can generate a public/private key pair and a corresponding key encipherment key. Provisioner 109 utilizes credential vault 107 to encrypt the private key using the key encipherment key. In response, credential vault 107 provides provisioner 109 with a wrapped private key. When credential vault 107 is later provided with the wrapped private key, credential vault 107 can return the unwrapped version of the private key. For example, signature server 103 can provide credential vault 107 with a wrapped digital signature private key and, if appropriate, credential vault 107 will return the unwrapped private key utilizing the appropriate key encipherment key.

In some embodiments, provisioner 109 is used to perform many of the cryptographic key provisioning steps for secure deployment platform 100. For example, provisioner 109 can generate and distribute the appropriate keys to the appropriate components of secure deployment platform 100. In some embodiments, provisioner 109 is used to generate a private/public key pair and a corresponding key encipherment key for encrypting the private key. Provisioner 109 provides the key encipherment key to credential vault 107 for storing. Provisioner 109 also provides the private key to credential vault 107 to be wrapped with the provided key encipherment key. The wrapped private key is then sent by provisioner 109 to signature server 103. In some embodiments, provisioner 109 also provides to signature server 103 a passphrase for protecting the wrapped private key in a key store. Provisioner 109 sends the corresponding public key/certificate to execution server 105.

In the example shown, network 151 can be a public or private network. In some embodiments, network 151 is a public network such as the Internet. In some embodiments, network 151 is composed of multiple networks and is configured to prevent one or more components shown in FIG. 1 from being accessed by outside clients and/or the other components of secure deployment platform 100. For example, in some embodiments, credential vault 107 and provisioner 109 may be located in a separate private network of network 151 where access is severely restricted. Network 151 may be configured such that requester 101 can not access credential vault 107 and/or provisioner 109 and that the only components of secure deployment platform 100 that requester 101 can access are signature server 103 and execution server 105. As another example, network 151 may be configured such that execution server 105 cannot access credential vault 107. In various embodiments, the connections between the different components of secure deployment platform 100 are secure connections.

Although single instances of some components have been shown to simplify the diagram, additional instances of any of the components shown in FIG. 1 may exist. For example, requester 101 may correspond to one or more servers. As another example, in some embodiments, multiple execution servers can exist, each co-located at a different data center with a different set of management service instances. In some embodiments, components not shown in FIG. 1 may also exist. For example, signature server 103 and/or execution server 105 can each include local (or remote) stores (not shown) for storing key and/or validation configuration data such as whitelists.

Figure 2:
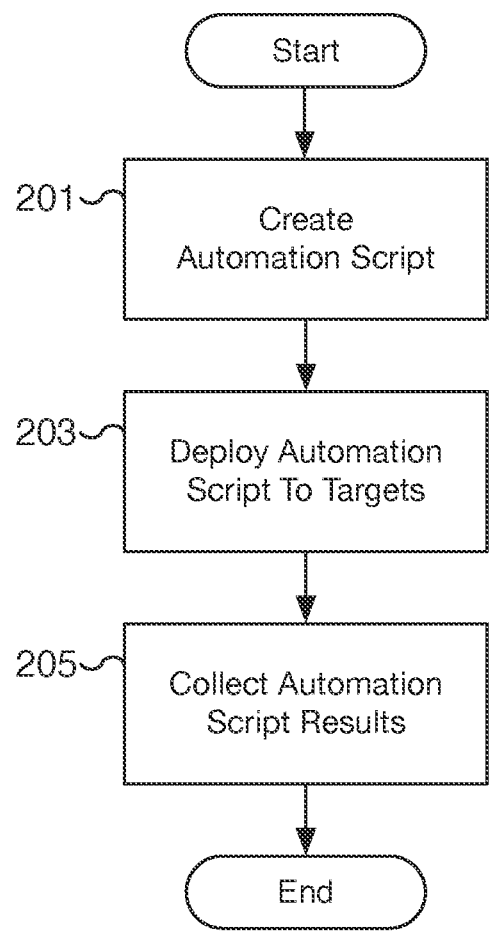
FIG. 2 is a flow chart illustrating an embodiment of a process for securely deploying an automation script to execute on management service instances.

FIG. 2 is a flow chart illustrating an embodiment of a process for securely deploying an automation script to execute on management service instances. For example, a customer utilizing a cloud-based service platform can utilize the process of FIG. 2 to remotely manage cloud-based service instances by deploying custom automation scripts that run directly on the customer's instances. Although a cloud-based platform can provide standard management functionality, a customer may need the additional functionality that only a custom automation script running directly on its management service instances can provide. For example, a customer may want to query each of its instances to gather specific operating metrics, to update or install software packages, to configure hardware or hardware drivers, or to perform another appropriate task. In some embodiments, the scripts are deployed to a secure deployment platform where the script is validated and securely deployed to each of the instances while minimizing security threats. In some embodiments, the secure deployment platform is secure deployment platform 100 of FIG. 1.

At 201, an automation script is created. For example, a customer creates an automation script to perform administrative tasks on customer management service instances. The automation script is created to run on the instances and can perform tasks such as configuration tasks, management tasks, analytics tasks, etc. In various embodiments, the secure deployment platform allows an executed automation script to return results. For example, an automation script can be created to query and return configuration settings for each target instance. As another example, an automation script can be created to gather performance metrics for each target instance. In some embodiments, as part of the creation process, the script is analyzed for security risks. For example, the created automation script can be analyzed for malware or other security threats. In some embodiments, an automation script is received by the cloud-based service platform where it undergoes malware analysis such as static malware analysis as one step in the validation process.

At 203, the automation script is deployed to target instances. For example, the automation script is received at a cloud-based service platform using a secure deployment platform. In some embodiments, the customer specifies the target management service instances on which to execute the approved automation script. The instances can be hardware servers including virtual hardware instances managed by the customer via the cloud service platform. The secure deployment platform validates the automation script, for example, to confirm that the customer has the proper access to run the automation script on the target instances. The customer can also specify execution configuration settings such as the user and/or execution permissions used to execute the script. In some embodiments, the received automation script is analyzed for malware and/or other security threats. In various embodiments, once validated, the secure deployment platform deploys the automation script to the target instances and returns automation script results.

At 205, automation script results are collected. For example, the results of running the automation script on the specified target management service instances are collected. In some embodiments, the results are returned directly to the customer via a user interface such as a web user interface to the cloud-based service platform. In some embodiments, the results are written to a data store such as a customer database.

Figure 3:
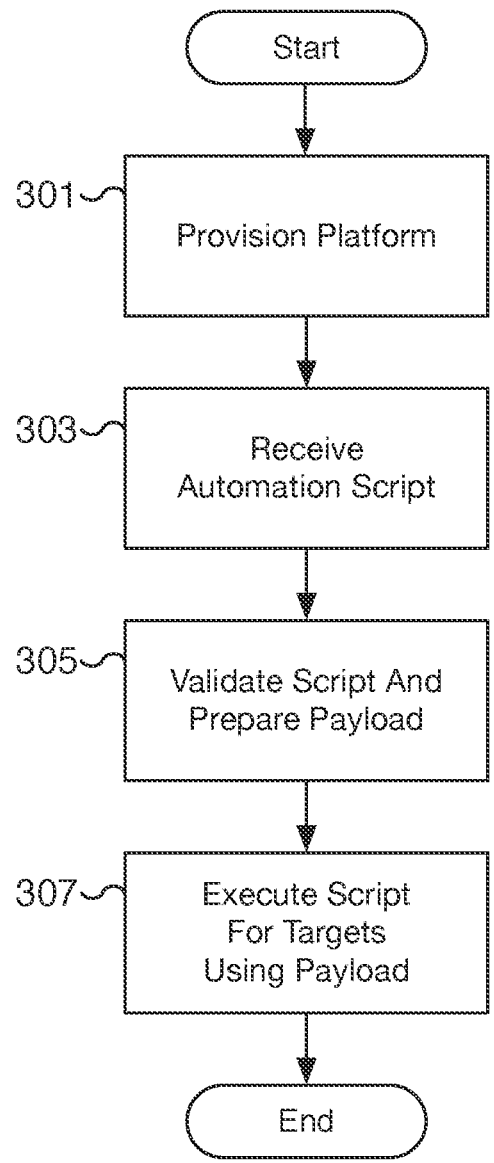
FIG. 3 is a flow chart illustrating an embodiment of a process for securely deploying an automation script to execute on management service instances.

FIG. 3 is a flow chart illustrating an embodiment of a process for securely deploying an automation script to execute on management service instances. Using the process of FIG. 3, a secure deployment platform is first provisioned and then receives and deploys automation scripts. In various embodiments, the process of FIG. 3 is run on a secure deployment platform to deploy automation scripts to a set of target management service instances. The secure deployment platform includes requester, signature server, execution server, credential system, and provisioner components. In some embodiments, the secure deployment platform is secure deployment platform 100 of FIG. 1 and the requester, signature server, execution server, credential system, and provisioner components are requester 101, signature server 103, execution server 105, credential vault 107, and provisioner 109, respectively, of FIG. 1. In some embodiments, the steps 303 and/or 305 are performed at 203 of FIG. 2 and the step of 307 is performed at 203 and/or 205 of FIG. 2.

At 301, a secure deployment platform is provisioned. For example, cryptographic keys are generated and distributed to the appropriate components of the secure deployment platform. In some embodiments, a provisioner generates a public and private key pair along with a key enchipherment key to encrypt the private key. The key enchipherment key is stored at a credential system. In some embodiments, the credential system also encrypts the private key. The encrypted private key is stored at a signature server and the public key/certificate is stored at an execution server. In some embodiments, the whitelist and/or other validation databases are updated and pushed to the various components such as the requester, signature server, and/or execution server to authenticate and validate connections and requests. In some embodiments, the keys stored by the signature server and execution server are stored in key stores which may be potentially unprotected for the case of public keys/certificates for the execution server or protected using a passphrase or another technique for the signature server. At 301, the key stores can be configured and initialized.

At 303, an automation script is received. For example, an automation script is received along with a set of target management service instances on which the automation script should execute. In some embodiments, additional execution configuration settings such as a run as setting describing the user and/or permissions to apply when running the automation script are received along with the script. In some embodiments, the automation script is received at a requester or by a requester service.

At 305, the automation script is validated and a corresponding payload is prepared. For example, the script is validated to confirm the script, requester, and target instances meet the appropriate security profile. In some embodiments, the validation includes applying one or more whitelists such as domain, sub-domain, and/or IP address whitelists. In the event the script and execution request are validated, a payload including the script and validation metadata is prepared. In some embodiments, the payload is signed using a private key and the signed payload is forwarded to an execution server.

At 307, the script is executed for the target instances using the signed payload. For example, the automation script is extracted from a signed payload and validated. The validation can include validating the requester and deployment instances. In some embodiments, the signed payload includes a security token used for validation. In the event the script and execution request are validated, the automation script is deployed to the target instances and executed. The results from each execution are gathered. In some embodiments, the results are returned to the original requester and/or written to a designated results data store.

Figure 4:
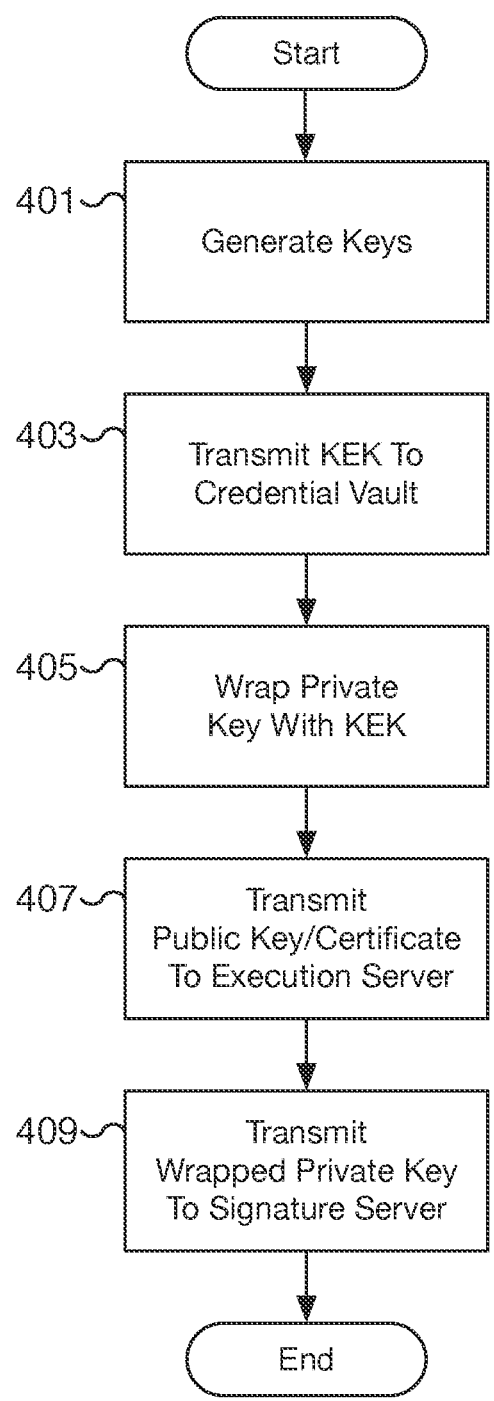
FIG. 4 is a flow chart illustrating an embodiment of a process for provisioning a secure deployment platform for automation scripts.

FIG. 4 is a flow chart illustrating an embodiment of a process for provisioning a secure deployment platform for automation scripts. Using the process of FIG. 4, a secure deployment platform is provisioned to accept and validate automation scripts for deployment at target management service instances. The provisioning steps include the generation and distribution of cryptographic keys to the various components of the secure deployment platform. In some embodiments, the secure deployment platform is secure deployment platform 100 of FIG. 1. In some embodiments, the process of FIG. 4 is performed at 301 of FIG. 3.

At 401, cryptographic keys are generated. For example, a public and private digital signature key pair along with a key enchipherment key (KEK) to encrypt the private key are generated. In some embodiments, the public/private key pair utilize an Edwards-curve digital signature algorithm or another appropriate digital signature scheme. In some embodiments, the KEK utilizes a symmetric-key algorithm.

In some embodiments, the keys and corresponding certificate are generated by a provisioner component. In some embodiments, the provisioner component is provisioner 109 of FIG. 1.

At 403, the key enchipherment key (KEK) is transmitted to a credential vault. For example, the KEK generated at 401 is transmitted by a provisioner component to a credential vault. The credential vault can have improved security and monitoring and stores the KEK until it is needed. In some embodiments, the credential vault is credential vault 107 of FIG. 1. In some embodiments, once the KEK is transmitted to the credential vault, the provisioner component no longer keeps a copy of the KEK.

At 405, the private key is wrapped with the key enchipherment key (KEK). For example, the private digital signature key generated at 401 is encrypted using the KEK generated at 401. In various embodiments, the private key is wrapped for the provisioner component by transmitting the private key to the credential vault. The credential vault encrypts the private key using the KEK and returns a wrapped private key to the provisioner component. In some embodiments, once the private key is transmitted to the credential vault, the provisioner component no longer keeps a copy of the private key.

At 407, the public key/certificate is transmitted to an execution server. For example, the public digital signature key generated at 401 is transmitted by the provisioner component to an execution server. In some embodiments, a digital signature certificate containing the public digital signature key is transferred to the execution server. The public key can be stored in a key store by the execution server. The key store can be a local or remote key store to the execution server. In various embodiments, the public key/certificate can be stored in an unprotected or protected key store. In some embodiments, once the public key is transmitted to the execution server, the provisioner component no longer keeps a copy of the public key. In some embodiments, multiple execution servers exist in the secure deployment platform and each receives a copy of the public key or corresponding certificate.

At 409, the wrapped private key is transmitted to a signature server. For example, the private digital signature key wrapped at 405 is transmitted by the provisioner component to a signature server. The encrypted private key can be stored in a protected key store by the signature server. The key store can be a local or remote key store to the signature server. In various embodiments, the encrypted private key is protected using a passphrase or another appropriate technique. In some embodiments, once the wrapped private key is transmitted to the signature server, the provisioner component no longer keeps a copy of the wrapped private key.

In some embodiments, the passphrases used to protect the keys stored in key stores are generated by the provisioner component and are distributed by the provisioner component to the appropriate components of the secure deployment platform. For example, the provisioner generates a passphrase for a protected key store and sends the passphrase to the signature server for storing the wrapped private key in its protected key store. In various embodiments, the signature server stores the passphrase and can utilize the passphrase to access the wrapped private key from its protected key store. In various embodiments, once the passphrase is transmitted to the appropriate component of the secure deployment platform, the provisioner component no longer keeps a copy of the generated passphrase. In some embodiments, multiple signature servers exist in the secure deployment platform and each receives a copy of the wrapped private key and a corresponding passphrase for storing the wrapped private key. In some embodiments, each signature service has a unique passphrase.

Figure 5:
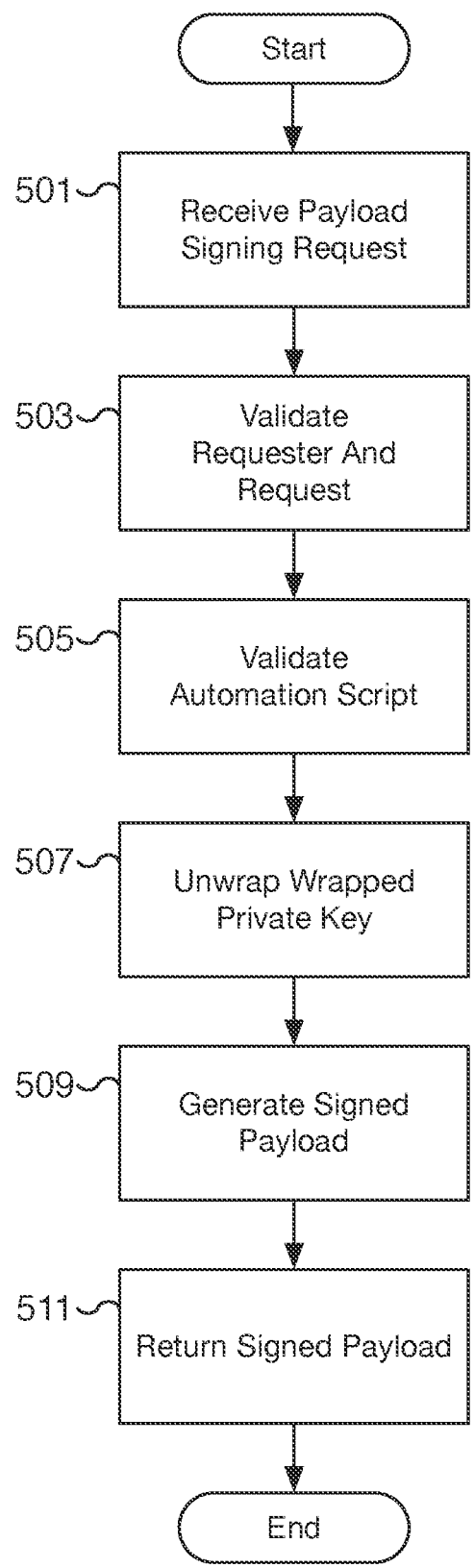
FIG. 5 is a flow chart illustrating an embodiment of a process for signing an automation script payload.

FIG. 5 is a flow chart illustrating an embodiment of a process for signing an automation script payload. Using the process of FIG. 5, an automation script is received at a secure deployment platform and validated. Once validated, a payload containing the script and validation metadata is signed. The signed payload can be used to execute the script on its target management service instances. In some embodiments, the secure deployment platform is secure deployment platform 100 of FIG. 1. In some embodiments, the process of FIG. 5 is performed at 303 and/or 305 of FIG. 3.

At 501, a payload signing request is received. For example, a requester sends a payload signing request that is received at a signature server. In some embodiments, the request is transmitted via a POST request. The connection between the requester and signature server can be a mutually authenticated connection. In some embodiments, the signature request includes the automation script, the usage mode, an execution configuration, and the set of management service instances on which to run the automation script. In some embodiments, the execution configuration includes configuration settings such as an execution time window.

At 503, the requester and request are validated. For example, the requester and request are validated by the signature server. The validation may include checking that the requester and target management service instances are on an IP address whitelist. In various embodiments, the whitelists can include ranges such as one or more IP address ranges. In some embodiments, domain, sub-domain, and/or common name (CN) whitelists can be utilized as well. In some embodiments, an instance whitelist is utilized for the target management service instances. For example, each customer and customer account may have an instance identifier whitelist identifying which users are allowed access to which instances. In some embodiments, the requester is validated by requiring a mutually authenticated session using a protocol such as HTTPS/TLS. In the event the requester and request are not both validated, the signature request is denied.

At 505, the automation script is validated. For example, the automation script is validated by the signature server. The validation may include checking that the script is non-malicious and/or does not perform any actions outside its allowable scope. For example, an analysis such as a static analysis may be performed on the script to detect security threats. In some embodiments, a dynamic analysis of the script is performed in a sandbox. In some embodiments, the script is analyzed in advance of the process of FIG. 5. In the event the script is not validated, the signature request is denied.

At 507, the wrapped private key is unwrapped. For example, the encrypted version of the digital signature private key is sent to a credential system such as credential vault 107 of FIG. 1 to be decrypted. An unwrapped version of the wrapped private key is returned to the signature server. In some embodiments, the unwrapped key may only be valid for a limited amount of time. For example, the signature server receives the unencrypted version of the digital signature private key from the credential system and caches the unwrapped key for a limited amount of time such as 300 seconds or another appropriate time length. If another valid signature request is received while the unwrapped key is still valid, the signature server can use the cached unwrapped key. In some embodiments, once the unwrapped key is no longer valid, it is expired and purged. For example, the memory used to store the unwrapped key is wiped. In some embodiments, the unwrapped key is expired after it has been used for signing more than a threshold number of times. For example, a threshold limit is configured to expire the unwrapped key once the unwrapped key has been used the threshold number of times.

In some embodiments, before the wrapped key can be decrypted by a credential system, the wrapped key must first be retrieved from a protected key store. For example, the wrapped key may be stored in a protected key store that can only be accessed using a passphrase. Once the wrapped key is retrieved from the key store using the passphrase, the wrapped key is transmitted to the credential system.

At 509, a signed payload is generated. For example, a payload including the validated script and validation metadata is signed using the digital signature private key unwrapped at 507. In some embodiments, the payload includes metadata information such as the list of target management service instances, the requester, execution configuration settings, and/or run as settings, among others. For example, an execution configuration setting can include an expiration time for a total allowable execution count for executing the automation script. In some embodiments, the execution configuration includes an execution time window or similar execution configuration. For example, the signed payload can be configured to allow it to be executed once (e.g., one-time), multiple-times, or based on a time and execution window, or another appropriate execution configuration.

In some embodiments, the signed payload is a signed security token. The additional metadata can include the issuer of the token, a subject (e.g., validated script), an audience (e.g., target instance(s)), an expiration time, a not valid before time, an issue time, a unique token identifier, and a key identifier, among other settings. For example, the key identifier can be used to retrieve the corresponding public key or certificate from a key store. Additional metadata can include access permissions for the script such as read, write, download, execute, or other appropriate permissions. In some embodiments, the payload or token can include custom metadata. For example, custom metadata can be included in the payload using a key:value format.

At 511, the signed payload is returned. For example, the signed payload is returned by the signature server to the requester or requester service. Once signed, the payload can be forwarded to an execution server where the payload can be verified and the automation script deployed to execute on the target instances.

Figure 6:
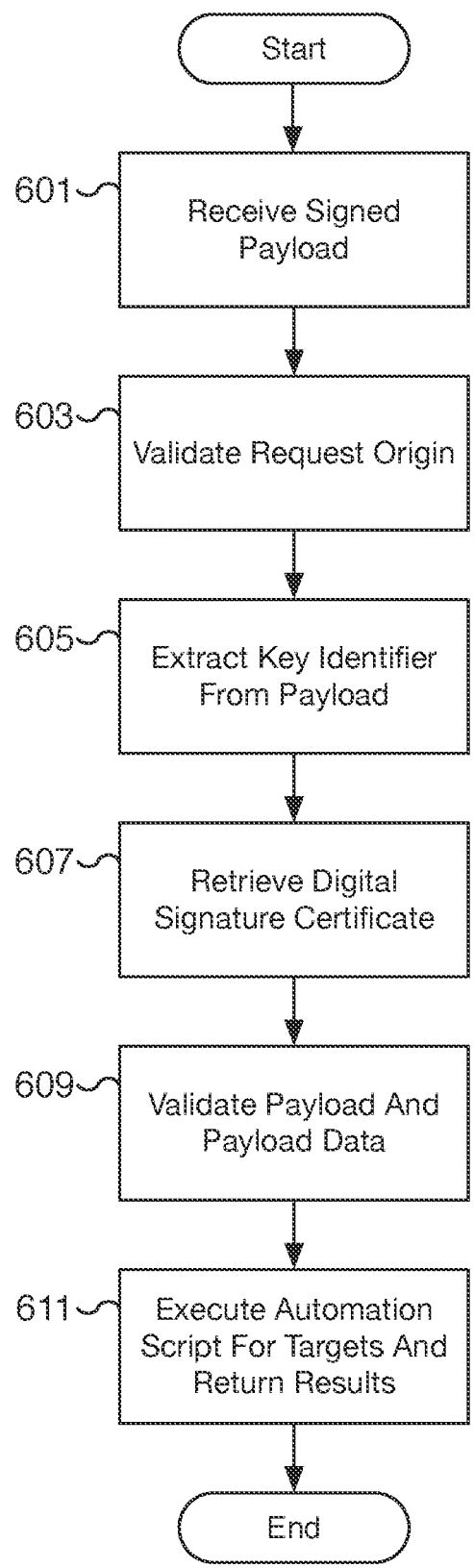
FIG. 6 is a flow chart illustrating an embodiment of a process for executing a signed automation script payload.

FIG. 6 is a flow chart illustrating an embodiment of a process for executing a signed automation script payload. Using the process of FIG. 6, a signed payload that includes at least an automation script is processed by a secure deployment platform. The signed payload is forwarded by a requester to an execution server. The execution server validates the signed payload and executes the associated automation script if valid. Return results are gathered at the execution server and provided to the requester. In some embodiments, the secure deployment platform is secure deployment platform 100 of FIG. 1. In some embodiments, the process of FIG. 6 is performed at 307 of FIG. 3.

At 601, a signed payload is received. For example, a signed payload that includes an automation script and validation metadata is received at an execution server. In some embodiments, the signed payload is a signed security token used to validate the signed payload. The signed payload may be signed at a signature server using the process of FIG. 5 and forwarded to the execution server from a requester.

At 603, the request origin is validated. For example, the request origin is validated by the execution server using a whitelist such an IP or another appropriate whitelist. In some embodiments, the request origin is included in the signed payload.

At 605, a key identifier is extracted from the payload. For example, a key identifier is extracted from the signed payload by the execution server. The key identifier is associated with the certificate that corresponds to the digital signature private key used to sign the payload.

At 607, a digital signature certificate is retrieved. Using the key identifier extracted at 605, the corresponding digital signature certificate is retrieved. In some embodiments, the digital signature certificate or public key is stored in a key store associated with the execution server. In various embodiments, the key identifier is used to retrieve the proper certificate. In some embodiments, a validation status is retrieved instead of a certificate.

At 609, the signed payload and the payload data are validated. For example, the signed payload is validated by the execution server using the certificate retrieved at 607. In some embodiments, the payload is a security token with a token issuer, token subject, token audience, expiration time, not valid before time, issue time, and token unique identifier, among other metadata. Using the token (or similar payload) validation metadata, the payload is validated. For example, the token is not valid if expired or if the current time is before the not valid before time. In some embodiments, a token is a single-use token and is invalid if replayed.

Once the signed payload is validated, the data of the payload including additional validation metadata is validated. For example, the validation metadata includes a list of target management service instances and execution configuration settings. An additional check can be performed to confirm the requester has access to the target instances. In some embodiments, the execution configurations include user and/or user permissions to use when executing the script.

At 611, the automation script is executed for the target instances and the return results are returned. For example, the automation script and list of target management service instances are extracted from the validated payload. The automation script is deployed to the target instances and executed. In some embodiments, the execution uses specified execution configuration settings included in the payload such as run as settings. The execution settings can include a user account and/or associated access privileges for executing the automation script. Once the automated script has completed its execution, the return results of the automation script are gathered and provided to the requester. In the event the script is not successfully executed, an appropriate error return result is sent to the requester.

Figure 7:
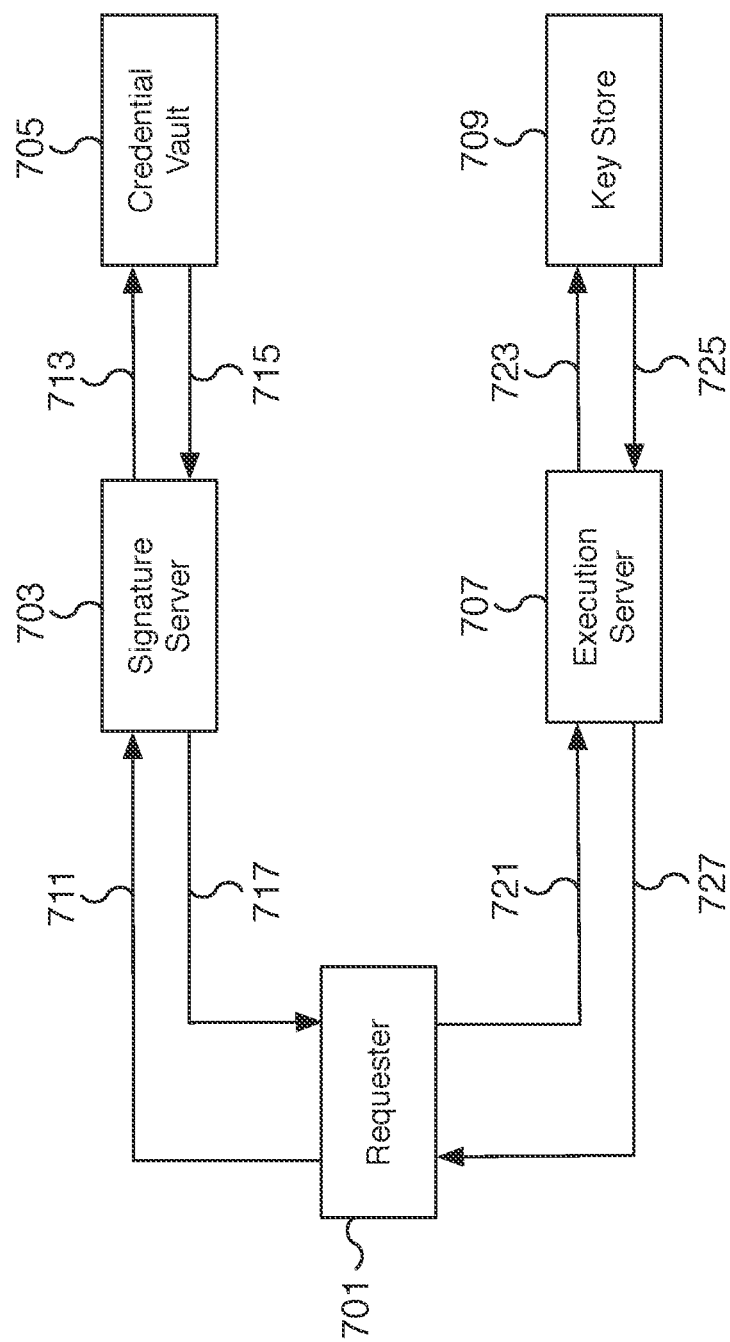
FIG. 7 is a block diagram illustrating the execution and communication process for securely deploying an automation script to execute on management service instances.

FIG. 7 is a block diagram illustrating the execution and communication process for securely deploying an automation script to execute on management service instances. The diagram of FIG. 7 illustrates the interactions of the different components of a secure deployment platform in response to a request to deploy an automation script to execute on target instances. Using the components of the secure deployment platform, the request is validated and a signed payload including the automation script and validation data is generated. The signed payload is used to deploy the automation script on the target instances. In some embodiments, the secure deployment platform is secure deployment platform 100 of FIG. 1. In some embodiments, the processes of FIGS. 5 and 6 follow the execution and communication process of the block diagram of FIG. 7. For example, in some embodiments, the process of FIG. 5 utilizes components requester 701, signature server 703, and credential vault 705 and the process of FIG. 6 utilizes components requester 701, execution server 703, and key store 709.

In the example shown, processing initiates at requester 701 with a request (not shown) for deploying an automation script. In response to the initial request, requester 701 sends signature request 711 to signature server 703. Signature request 711 includes at least the automation script and a list of target management service instances. At signature server 703, validation is performed on the request and requester. In some embodiments, the validation is performed at 503 and/or 505 of FIG. 5. If valid, signature server 703 retrieves an encrypted version of the digital signature private key from a key store (not shown). Signature server 703 initiates unwrap request 713 to credential vault 705 to unwrap the encrypted version of the digital signature private key. Credential vault 705 includes in unwrap response 715 the unencrypted version of the digital signature private key. Once the unwrapped private key is received at signature server 703, signature server 703 generates a signed payload that includes the automation script and validation metadata including a key identifier and the target management service instances. The signed payload is included in signature request response 717 that signature server 703 transmits to requester 701.

In response to receiving signature request response 717, requester 701 forwards signature request response 717 as signed payload message 721 to execution server 707. Execution server 707 validates the origin associated with signed payload message 721 and extracts the key identifier from the included signed payload. The key identifier is used to generate certificate request 723 that is sent to key store 709. In some embodiments, key store 709 is a local key store but can be a remote key store as appropriate. The certificate corresponding to the key identifier is retrieved from key store 709 and included in certificate response 725. Execution server 707 uses the certificate of certificate response 725 to validate the signed payload of signed payload message 721 and also the data within the signed payload. In some embodiments, the validation is performed at 609 of FIG. 6. Once validation is complete, execution server 707 deploys the automation script to the targeted management service instances (not shown). The automation script is executed on the corresponding instances and script results are returned to execution server 707. Execution server 707 transmits the automation script results to requester 701 as automation script results message 727. In some embodiments, requester 701 forwards the automation script results to the initiator of the automation script deployment request.

Figure 8:
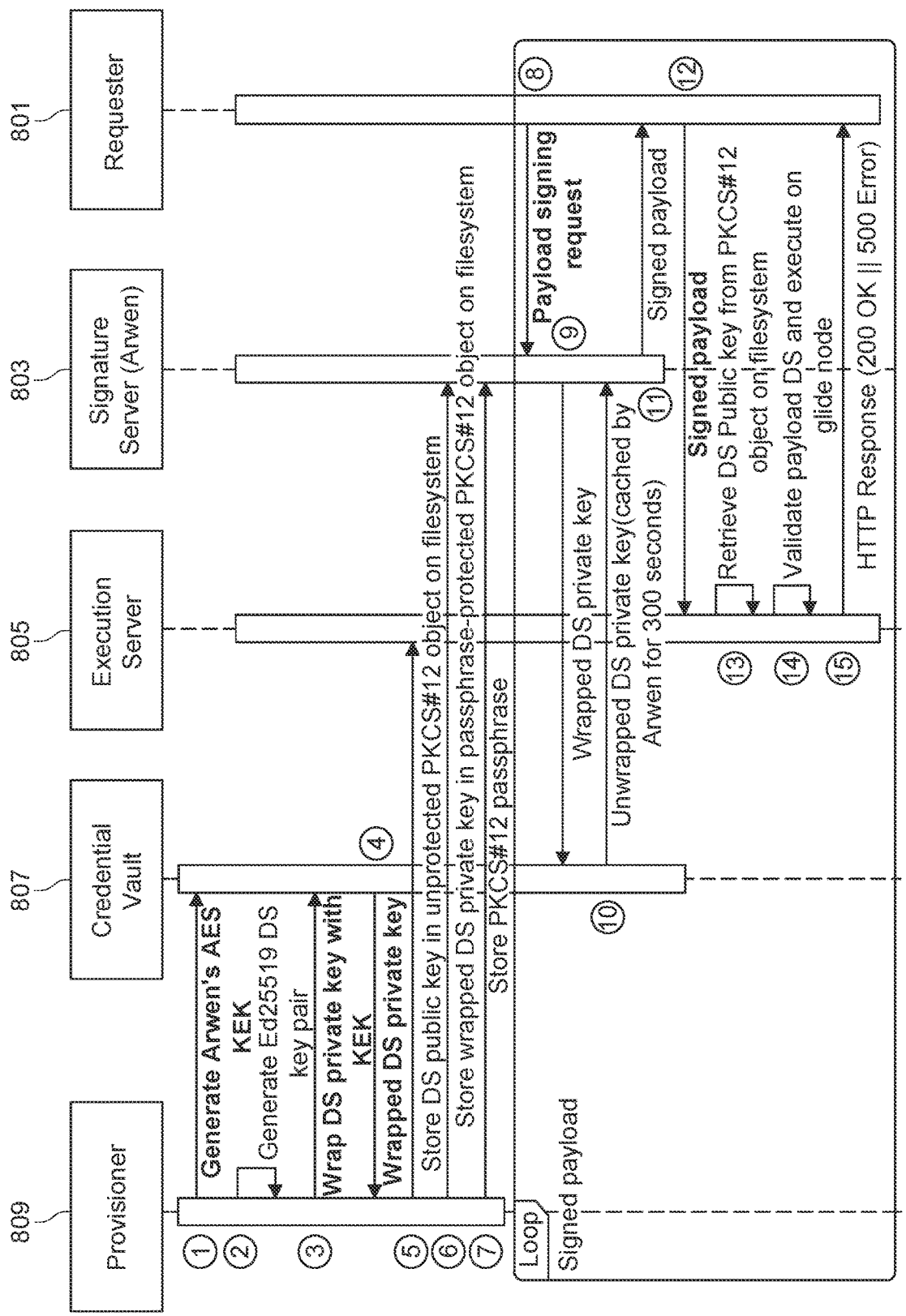
FIG. 8 is a diagram illustrating the process of securely deploying an automation script to execute on management service instances.

FIG. 8 is a diagram illustrating the process of securely deploying an automation script to execute on management service instances. The diagram of FIG. 8 illustrates the interactions of the different components of a secure deployment platform starting with the provisioning of the secure deployment platform and responding to a request to execute an automation script on target management service instances. In some embodiments, the secure deployment platform is secure deployment platform 100 of FIG. 1. In the example shown, the secure deployment platform includes requester 801, signature server (Arwen) 803, execution server 805, credential vault 807, and provisioner 809. In FIG. 8, signature server 803 is also referenced as Arwen.

In some embodiments, the provisioning steps are shown as steps 1-7. The provisioning steps include the generation and distribution of cryptographic keys by provisioner 809. In particular, an encrypted version of the digital signature private key is stored at signature server (Arwen) 803 and a corresponding public key/certificate is stored at execution server 805. The key encipherment key (KEK) used to encrypt the digital signature private key is stored at credential vault 807. In various embodiments, the provisioning steps are performed at 301 of FIG. 3 and/or correspond to the process of FIG. 4.

In some embodiments, the steps for signing an automation script payload are shown as steps 8-11. A signed payload that includes the automation script is generated by signature server 803 in the event the automation script is authorized to execute on the requested target management service instances. In particular, the signature request steps include requesting a signature request by requester 801 from a signature server 803, validating the request, retrieving an unencrypted version of the digital signature private key from credential vault 807, and generating a signed payload once the request and script have been validated. Signature server 803 sends the generated signed payload to requester 801. In various embodiments, the steps for signing an automation script payload are performed at 303 and/or 305 of FIG. 3 and/or correspond to the process of FIG. 5.

In some embodiments, the steps for executing a signed automation script payload are shown as steps 12-15. In particular, a signed payload forwarded by requester 801 is validated at execution server 805 using a corresponding certificate. In the example shown, the certificate or public key is retrieved from a key store of a local filesystem of execution server 805. The certificate can be retrieved using a key identifier stored in the signed payload. The payload and payload metadata are validated. Once validation is completed, the automation script is executed on target instances such as glide nodes and the results returned to requester 801. In various embodiments, the steps for executing a signed automation script payload are performed at 307 of FIG. 3 and/or correspond to the process of FIG. 6.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving an encrypted version of a digital signature private key;
   receiving a request to sign a provided payload, wherein the payload includes an automation script specified to execute on one or more management service instances;
   validating the automation script, including by modifying the payload to add, by a first-party, metadata associated with the validation to the payload that includes the automation script specified at least in part by a third-party different from the first-party of the added metadata;
   sending the encrypted version of the digital signature private key to a credential system;
   receiving from the credential system, an unencrypted version of the digital signature private key that is valid for a limited amount of time;
   using the unencrypted version of the digital signature private key to sign the modified payload including the automation script and the added metadata; and
   providing the signed modified payload in response to the request to sign the provided payload, wherein the signed modified payload is configured to, in response to a request to execute the automation script on the one or more of the management service instances, be verified using a public key corresponding to the digital signature private key and allow a validation of the automation script at least in part by using the included added metadata.

2. The method of claim 1, wherein the added metadata associated with the validation to the payload includes an execution configuration, a run as setting, and at least one identifier of the one or more of the management service instances.

3. The method of claim 2, wherein the execution configuration is stored in a security token.

4. The method of claim 2, wherein the execution configuration specifies an expiration time or a total allowable execution count, and wherein the execution configuration is associated with one or more instances of the automation script executing on the one or more management service instances.

5. The method of claim 4, wherein the total allowable execution count is one.

6. The method of claim 4, wherein the expiration time is a time limit.

7. The method of claim 1, further comprising storing the received encrypted version of the digital signature private key on a local data store in a protected key store.

8. The method of claim 7, further comprising receiving a passphrase for the protected key store.

9. The method of claim 1, wherein the unencrypted version of the digital signature private key is stored in a local cache for the limited amount of time.

10. The method of claim 9, further comprising expiring the unencrypted version of the digital signature private key from the local cache after the limited amount of time has passed.

11. The method of claim 9, further comprising expiring the unencrypted version of the digital signature private key after the unencrypted version of the digital signature private key has been used for signing more than a threshold number of times.

12. The method of claim 1, further comprising validating a requester of the request to sign the provided payload.

13. The method of claim 12, wherein the validation of the requester includes a session validation and a whitelist validation.

14. The method of claim 13, wherein the session validation is mutually authenticated.

15. The method of claim 13, wherein the whitelist validation includes a domain, a sub-domain, or an IP address whitelist validation.

16. The method of claim 15, wherein the IP address whitelist validation includes an IP address range.

17. The method of claim 1, wherein validating the automation script includes analyzing the automation script to detect a security threat.

18. The method of claim 1, wherein the automation script specified to execute on the one or more management service instances is configured to provide a return result to an execution requester of the automation script.

19. A system, comprising:
   a processor; and
   a memory coupled to the processor, wherein the memory is configured to provide the processor with instructions which when executed cause the processor to:
   receive an encrypted version of a digital signature private key;

receive a request to sign a provided payload, wherein the payload includes an automation script specified to execute on one or more management service instances;
validate the automation script, including by modifying the payload to add, by a first-party, metadata associated with the validation to the payload that includes the automation script specified at least in part by a third-party different from the first-party of the added metadata;
send the encrypted version of the digital signature private key to a credential system;
receive from the credential system, an unencrypted version of the digital signature private key that is valid for a limited amount of time;
use the unencrypted version of the digital signature private key to sign the modified payload including the automation script and the added metadata; and
provide the signed modified payload in response to the request to sign the provided payload, wherein the signed modified payload is configured to, in response to a request to execute the automation script on the one or more of the management service instances, be verified using a public key corresponding to the digital signature private key and allow a validation of the automation script at least in part by using the included added metadata.

20. A computer program product, the computer program product being embodied in a non-transitory computer readable medium and comprising computer instructions for:

receiving an encrypted version of a digital signature private key;
receiving a request to sign a provided payload, wherein the payload includes an automation script specified to execute on one or more management service instances;
validating the automation script, including by modifying the payload to add, by a first-party, metadata associated with the validation to the payload that includes the automation script specified at least in part by a third-party different from the first-party of the added metadata;
sending the encrypted version of the digital signature private key to a credential system;
receiving from the credential system, an unencrypted version of the digital signature private key that is valid for a limited amount of time;
using the unencrypted version of the digital signature private key to sign the modified payload including the automation script and the added metadata; and
providing the signed modified payload in response to the request to sign the provided payload, wherein the signed modified payload is configured to, in response to a request to execute the automation script on the one or more of the management service instances, be verified using a public key corresponding to the digital signature private key and allow the validation of the automation script at least in part by using the included added metadata.

* * * * *